(12) United States Patent
Chen (10) Patent No.: US 9,990,232 B2
(45) Date of Patent: Jun. 5, 2018

(54) QUALITY OF SERVICE TAGGING FOR COMPUTING JOBS

(71) Applicant: RED HAT, INC., Raleigh, NC (US)

(72) Inventor: Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 189 days.

(21) Appl. No.: 14/876,632

(22) Filed: Oct. 6, 2015

(65) Prior Publication Data

US 2017/0097851 A1   Apr. 6, 2017

(51) Int. Cl.
  *G06F 9/46*     (2006.01)
  *G06F 9/50*     (2006.01)
  *G06F 9/455*    (2018.01)

(52) U.S. Cl.
  CPC ........ *G06F 9/5027* (2013.01); *G06F 9/45558* (2013.01); *G06F 2009/4557* (2013.01)

(58) Field of Classification Search
  None
  See application file for complete search history.

(56) References Cited

U.S. PATENT DOCUMENTS

| | | | |
|---|---|---|---|
| 6,205,466 B1* | 3/2001 | Karp | G06F 9/468 707/999.001 |
| 6,434,155 B1 | 8/2002 | Jones et al. | |
| 7,472,349 B1* | 12/2008 | Srivastava | G06F 9/44 |
| 7,620,706 B2* | 11/2009 | Jackson | G06F 9/5027 709/203 |
| 8,238,250 B2 | 8/2012 | Fung | |
| 8,261,277 B2* | 9/2012 | Prabhakar | G06F 9/5044 709/201 |
| 8,407,413 B1 | 3/2013 | Yucel et al. | |
| 8,458,711 B2* | 6/2013 | Illikkal | G06F 9/5038 718/100 |
| 8,468,530 B2* | 6/2013 | Fraenkel | G06F 9/5027 718/102 |
| 8,832,695 B2* | 9/2014 | Ujibashi | G06F 9/4881 718/100 |
| 8,832,707 B2* | 9/2014 | Henderson | G06F 9/5027 709/223 |

(Continued)

FOREIGN PATENT DOCUMENTS

WO    WO2012160465 A1    11/2012

OTHER PUBLICATIONS

Instance Resource Quota in OpenStack; https://wiki.openstack.org/wiki/InstanceResourceQuota; 6 pgs.; retrieved Oct. 6, 2015.

(Continued)

*Primary Examiner* — Hiren Patel
(74) *Attorney, Agent, or Firm* — Lowenstein Sandler LLP (57) ABSTRACT

A processing device receives a job request to allocate one or more resources in a resource environment to a job. The job is related to an application. The job request specifies the job using a first description language. The processing device extracts one or more tags from the job request. The one or more tags describes handling parameters of the job and features of the application. The one or more tags are in a second description language different from the first description language. The processing device allocates one or more resources in the resource environment to the job in view of the one or more tags.

15 Claims, 5 Drawing Sheets

(56) References Cited

U.S. PATENT DOCUMENTS

| | | | | |
|---|---|---|---|---|
| 9,026,658 | B2* | 5/2015 | Xu | G06F 9/5027 709/202 |
| 9,069,610 | B2* | 6/2015 | Chakravorty | G06F 9/50 |
| 9,645,845 | B2* | 5/2017 | Marwinski | G06F 9/4843 |
| 2004/0015976 | A1* | 1/2004 | Lam | G06F 9/5027 718/104 |
| 2005/0204054 | A1* | 9/2005 | Wang | G06F 9/5011 709/232 |
| 2005/0267856 | A1* | 12/2005 | Woollen | G06F 8/61 |
| 2006/0195846 | A1* | 8/2006 | Benedetti | G06F 9/5027 718/102 |
| 2006/0218551 | A1* | 9/2006 | Berstis | G06F 9/4881 718/102 |
| 2006/0230405 | A1* | 10/2006 | Fraenkel | G06F 9/5027 718/104 |
| 2007/0016907 | A1* | 1/2007 | Benedetti | G06F 9/5038 718/104 |
| 2007/0022425 | A1* | 1/2007 | Jackson | G06F 9/5027 718/104 |
| 2007/0100469 | A1* | 5/2007 | Falsi | G06F 11/3696 700/11 |
| 2007/0294697 | A1* | 12/2007 | Theimer | G06F 9/5027 718/102 |
| 2008/0040217 | A1* | 2/2008 | Dellovo | G06Q 10/0637 705/14.41 |
| 2008/0082982 | A1* | 4/2008 | Benedetti | G06F 9/4843 718/104 |
| 2008/0174818 | A1* | 7/2008 | Kanamoto | G06F 3/1204 358/1.15 |
| 2008/0301025 | A1* | 12/2008 | Boss | G06Q 10/06 705/37 |
| 2009/0089785 | A1* | 4/2009 | Marwinski | G06F 9/465 718/102 |
| 2010/0042998 | A1* | 2/2010 | Abdelnur | G06F 9/4843 718/101 |
| 2013/0325924 | A1 | 12/2013 | Moshfeghi | |
| 2013/0332927 | A1* | 12/2013 | Tang | G06F 9/45545 718/1 |
| 2014/0006597 | A1 | 1/2014 | Ganguli et al. | |
| 2014/0066015 | A1* | 3/2014 | Aissi | H04W 12/06 455/411 |
| 2014/0115330 | A1* | 4/2014 | Chen | H04L 63/18 713/166 |
| 2014/0115624 | A1* | 4/2014 | Chen | H04N 21/25 725/25 |
| 2014/0173232 | A1 | 6/2014 | Reohr et al. | |
| 2015/0063349 | A1 | 3/2015 | Ardalan et al. | |
| 2015/0142878 | A1* | 5/2015 | Hebert | H04L 67/10 709/203 |
| 2015/0339210 | A1* | 11/2015 | Kopp | G06F 11/3495 718/100 |
| 2016/0062795 | A1* | 3/2016 | Hu | H04L 47/783 718/104 |
| 2017/0078442 | A1* | 3/2017 | Pacella | H04L 67/1008 |

OTHER PUBLICATIONS

Multiprotocol Label Switching; Wikipedia; http://en.wikipedia.org/wiki/Multiprotocol_Label_Switching; Sep. 22, 2015; 8 pgs.

Madvise(2)—Linux man page; http://linux.die.net/man/2/madvise;die.net; 4 pgs.; retrieved Oct. 6, 2015.

Fadvise(2)—Linux man page; http://linux.die.net/man/2/fadvise;die.net; 2 pgs.; retrieved Oct. 6, 2015.

Haynes, T.; NFS Version 4 Minor Version 2; https://tools.ietf.org/html/draft-ietf-nfsv4-minorversion2-36; Internet-Draft (expires Oct. 24, 2015); Internet Engineering Task Force (IETF); Apr. 22, 2015; 97 pgs.

Resource Quota in Kubernetes; https://github.com/kubernetes/kubernetes/blob/master/docs/admin/resource-quota.md; GitHub; 4 pgs.; retrieved Oct. 6, 2015.

Zhang, Rui; Getting Your Big Data Priorities Straight: A Demonstration of Priority-Based QoS Using Social-network-Driven Stock Recommendation; http://www.vldb.org/pvldb/vol7/p1665-zhang.pdf; Sep. 1-5, 2014; IBM Research Almaden, Imperial College London; pp. 1665-1668.

Yu, Jia; QoS-Based Scheduling of Workflows on Global Grids; http://www.cloudbus.org/students/JiaYuPhDThesis.pdf; Oct. 2007; The University of Melbourne, Australia; 175 pgs.

* cited by examiner

QUALITY OF SERVICE TAGGING FOR COMPUTING JOBS

TECHNICAL FIELD

The present disclosure relates to quality of service, and more particularly, to quality of service tagging for computing jobs.

BACKGROUND

Businesses that want to reduce operating expenses and be able to scale resources rapidly are generally utilizing Infrastructure-as-a-Service (IaaS) cloud providers, which deliver computing, storage, and networking resources to the businesses. Businesses that deal with collections of data sets that are significantly large and complex that it becomes difficult to process using conventional database management tools are generally implementing big data frameworks and solutions that support scalability and provide intensive processing power. Quality of service (QoS) aware job scheduling is generally crucial to cloud data environments and big data environments for improving serviceability, reliability, and accountability. Some traditional cloud and big data frameworks offer some form of QoS awareness by allowing users to specify resource quota. For example, traditionally, QoS has been specified as the number of CPUs, amount of memory, and disk I/O bandwidth, etc.

Traditional QoS solutions generally provide little information about the nature of the jobs, and end users typically are not familiar with how these resource quotas are translated to their perceived quality of service. The conventional and numerous metrics tend to become cumbersome for both application authors to understand and cloud operators to deploy. Current hardcoded quotas are generally either hard to satisfy or fail to provide the expected service guarantee if the quotas are not set properly. Various cloud and big data frameworks also use different resource quotas and are generally not perceived the same way throughout different components in an environment. If new types of resources (e.g. new storage media or persistent memory) is introduced into a cloud or big data environment or if existing resources are upgraded, the traditional hard coded QoS quota systems also need to be updated, which may contribute to service disruption. As cloud and big data environments exponentially grow, the measuring, tracing, and enforcing or resource quotas in traditional solutions are hard to implement in a scalable manner.

BRIEF DESCRIPTION OF THE DRAWINGS

The present disclosure will be understood more fully from the detailed description given below and from the accompanying drawings of various implementations of the disclosure.

DETAILED DESCRIPTION

Implementations of the present disclosure describe quality of service tagging for computing jobs. A resource provider (e.g., cloud provider, big data provider) can provide a quality of service when resources are requested by end-users for application jobs to be performed. Traditionally, resource providers offer QoS metrics (e.g., how much CPU, how much bandwidth, how much disk I/O speed, etc.), but it is generally complicated for end-users to understand how the metrics map to the levels of quality which an end-user may desire for an application. The conventional metrics are usually not scalable as resource provider environments expand. Implementations of the present disclosure create and provide descriptive tags that can be easily understood by an end-user that is submitting a request for resources and provide an indication to a user (e.g., system administrator) of a resource environment (e.g., cloud, big data environment) of how to provision resources for the requested job. Implementations of the present disclosure create tags using a description language that is independent of the underlying language of a job definition to allow consistency and compatibility across heterogeneous scheduling systems, and to simplify administration and help reduce overhead in processing job requests. Implementations of the present disclosure provide informative and configurable descriptors as tags to implement flexibility in scaling the tags as resource environments expand and compatibility when components of a scheduling system may change. Implementations of the present disclosure provide a declarative tag format allowing tags to be easy augmented. The tags remain immutable throughout the jobs' life to provide end to end consistency.

Figure 1:
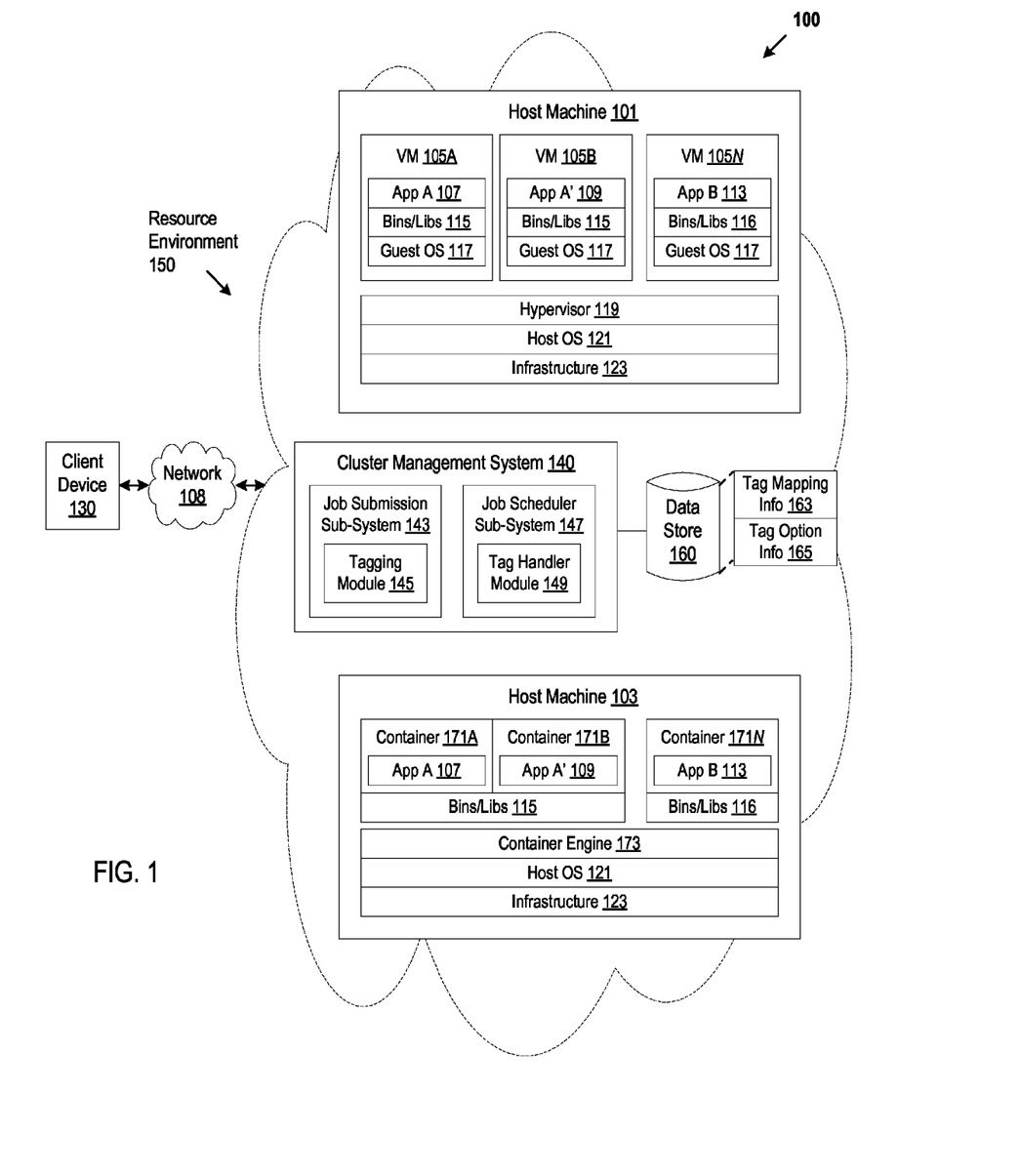
FIG. 1 is an example system architecture in which implementations of the present disclosure can be implemented.

FIG. 1 is an example system architecture 100 in which implementations of the present disclosure can be implemented. The system architecture 100 can include a resource environment 150 that can provide computing resources (e.g., computing, storage, and networking resources) to entities. The resources of the resource environment 150 can be allocated to and consumed by multiple tenants. A tenant can be an entity and/or sub-entity. An entity, as referred to herein, can represent any software provider, service provider, a business organization such as a corporation, an educational institution such as a college and university, etc. For example, several entities may be different Enterprise companies and may store and access different data sets in the resource environment 150. In another example, several sub-entities may be different departments within the same entity, such as an Enterprise company, and may store and access data in the resource environment 150.

Computing resources can include, and are not limited to, processing devices, host machines, software containers, virtual machines, applications, memory, hypervisors, etc. Storage resources can include, and are not limited to, storage servers, storage software, disks, data stores, etc. Networking resources can include, and are not limited to, network interface cards, ports, routers, switches, internet protocol addresses, network domains, etc.

An entity can utilize the resource environment 150 for application server virtualization using a software container (hereinafter referred to as "container") model and/or a virtual machine (VM) model. The resource environment 150 can allocate resources for instantiating a VM 105A,105B, 105N or a container 171A,171B,171N for virtualizing an application server for executing an application 107,109,113. An application 107,109,113 can be any type of application including, for example, a web application, a desktop application, a browser application, etc. An application 107,109, 113 can be a messaging application, a video application, a social networking application, video sharing application, photo sharing application, chat application, mobile application of a content provider or any combination of such applications. An application 107,109,113 can be a computationally large or data-intensive application, such as a forecasting application, a modeling application, a data analysis application, etc. An application 107,109,113 can be a real-time application. The term "real-time" indicates that a transmission of a user communication from sender to receiver and/or receipt of the user communication by the receiver is made within a specified time constraint (e.g., under 50 microseconds). For example, during a collaboration session via video chat or videoconference, a real-time user communication includes video transmission of a user and audio transmission of the user as the sender user is speaking, and receipt of the video and audio transmission by the receiver user as the sender user is speaking.

Each VM 105A,105B,105N or container 171A,171B, 171N can deploy an application 107,109,113. A host machine 101,103 can allocate a certain amount of its resources to individual virtual machines (e.g., VM 105A, 105B,105N) and/or individual containers (e.g., containers 171A,171B,171N), and can multiplex the underlying hardware platform (e.g., infrastructure 123) of the respective host machine 101,103 among the corresponding VMs 105A, 105B,105N and/or containers 171A,171B,171N on a respective host machine 101,103. Each host machine 101,103 can be a server computer system, a desktop computer or any other computing device. The host machines 101,103 can communicate to each other via a network, which may be may be a private network (e.g., a local area network (LAN), a wide area network (WAN), intranet, or other similar private networks) or a public network (e.g., the Internet).

A container can refer to an isolated set of resources allocated to executing an application independent from other applications, Each VM 105A,105B,105N can use the allocated resources (e.g., compute resources) to execute its respective guest operating system 117 and application (e.g., application 107,109,113). Each container 171A,171B,171N can use the allocated resources (e.g., compute resources) to execute its respective application (e.g., application 107,109, 113).

Containers 171A,171B,171N require less memory space and deliver very fast launch times, while virtual machines 105A,105B,105N offer the security of a respective dedicated operating system (e.g. guest OS 117) and harder logical boundaries. For virtual machines 105A,105B,105N, the software layer providing the virtualization is commonly referred to as a hypervisor 119 and is also known as a virtual machine monitor (VMM), a kernel-based hypervisor, or part of a host operating system. The hypervisor 119 can emulate the underlying hardware (e.g., infrastructure 123) of the host machine (e.g., host machine 101), making the use of the VMs 105A,105B,105N transparent to the respective guest operating system 117 and the user of the host machine 101. In a VM model, a hypervisor 119 talks to the hardware (e.g., infrastructure 123) as if the virtual machine's respective operating system (e.g., guest OS 117) and application 107, 109,113 constituted a separate, physical host machine. The operating system (e.g., guest OS 117) in the respective virtual machine 105A,105B,105N can be completely different from the host operating system 121. In a VM model, each VM 105A,105B,105N can include the application(s) 107,109,113, the binaries and libraries (e.g., bins/libs 115, 116) for the respective application(s) 107,109,113 and a respective guest operating system 117.

A virtual machine 105A,105B,105N can be a software implementation of a machine (computer) that includes its own operating system (referred to as a guest operating system 117) and executes application programs (e.g., application 107,109,113), thus generally providing a more secure environment than containers 171A,171B,171N. For example, VM 105A can deploy Application A (illustrated as App A 107 in FIG. 1), its own set of binaries and libraries (e.g., bins/libs 115) for Application A, and its own guest OS 117. VM 105B can also deploy Application A (illustrated as App A' 109 in FIG. 1), its own set of binaries and libraries (e.g., bins/libs 115) for App A' 109, and its own guest OS 117. VM 105N may deploy a different application, Application B (illustrated as App B 113 in FIG. 1), its own set of binaries and libraries (e.g., bins/libs 116) for App B 113, and its own guest OS 117.

While many dozens of virtual machines 105A,105B,105N can be put on a single host machine (e.g., host machine 101), each running a respective application 105A,105B,105N with its own guest operating system 117, hundreds or even thousands of containers 171A,171B,171N can be loaded on a host machine (e.g., host machine 103). In a container model, each container 171A,171B,171N wraps application software for deploying an application 107,109,113 in a complete file system. The applications (e.g., applications 107,109,113) in containers 171A,171B,171N can run under the host operating system 121, where all of the applications 107,109,113 on a corresponding host machine 103 share certain libraries of the host OS 121 and the kernel of the host OS 121. A containerized application shares the kernel of the host operating system 121 to execute work. In one implementation a container can run on a virtual machine to provide an extra layer of separation between applications running on the guest operating system. In one implementation a virtual machine can run on a container to maintain isolation and security properties of virtual machines while being able to package and distribute software as a container.

An individual container 171A,171B,171N can include a respective application 107,109,113 and all of the application dependencies, but can share the binaries and libraries of the same application with other containers on the same host machine 103, and share the kernel of the host OS 121 with other containers on the same host machine 103. For example, container 171A can deploy Application A (illustrated as App A 107 in FIG. 1) and container 171B can also deploy Application A (illustrated as App A' 109 in FIG. 1). Container 171A and container 171B can share a set of binaries and libraries (e.g., bins/libs 115) for Application A. Container 171N may deploy a different application, Application B (illustrated as App B 113 in FIG. 1) and its own set of binaries and libraries (e.g., bins/libs 116) for Application B.

Containers 171A,171B,171N can be created and instantiated much faster than virtual machines (e.g., VM 105A, 105B,105N) because VMs 105A,105B,105N generally should retrieve gigabytes (e.g., 10-20 GBs) of data for a respective guest operating systems 117 from storage. The workload (e.g., application) in the container 171A,171B, 171N uses the kernel of the host operating system 121, and does not retrieve a guest operating system 117 from storage. Since a container 171A,171B,171N does not have to load a guest operating system 117, the resource environment 150 can load a container 171A,171B,171N quickly (e.g., a split-second), compared to the minutes that are typically taken to load a virtual machine (e.g., VM 105A,105B, 105N). The speed in instantiating a container 171A,171B, 171N allows the resource environment 150 to respond to job requests quickly, for example, if an application 107,109,113 has a sudden spike in user activity (e.g., increased user search activity, increased user online ordering, increased video downloads, increased website visits, etc.).

An entity can request a computing job (hereinafter referred to as "job"), which is related to a particular application (e.g., application 107,109,113), to be performed by the resource environment 150 using the resources of the resource environment 150. For example, an entity may request that the resource environment 150 perform a job related to a text messaging application. The resource environment 150 can receive the job request, allocate resources for instantiating a container (e.g., container 171A,171B) and/or a VM (e.g., VM 105A,105B) to deploy the text messaging application as application A 107,109, and schedule the job to be performed by the allocated resources.

Client devices 130, the computing machines of the cluster management system 140, and the host machines 101,103 can be coupled via a network 108, which may be may be a private network (e.g., a local area network (LAN), a wide area network (WAN), intranet, or other similar private networks) or a public network (e.g., the Internet).

Entity users can interact with the resource environment 150 using client computer systems, such as client devices 130. There can be multiple client devices 130. For brevity and simplicity, client device 130 is used as an example in architecture 100. The client device 130 can be a server computer, a desktop computer, a set-top box, a gaming console, a television, or a portable computing device such as, and not limited to, mobile telephones, personal digital assistants (PDAs), portable media players, netbooks, laptop computers, an electronic book reader and the like. The client device 130 can be provided by and managed by a resource environment 150 tenant, such as an Enterprise company.

The resource environment 150 can include a cluster management system 140 for creating computing job requests and the scheduling of the job requests. The cluster management system 140 can include one or more computing machines, such as a server computer system, a desktop computer or any other computing device. The computing machines of the cluster management system 140 can communicate to each other via a network, which may be may be a private network (e.g., a local area network (LAN), a wide area network (WAN), intranet, or other similar private networks) or a public network (e.g., the Internet).

The cluster management system 140 can include a job submission sub-system 143 and a job scheduler sub-system 147. An entity user can create a job request using the client device 130 to access the job submission sub-system 143. The job scheduler sub-system 147 can provide a graphical user interface (GUI), which can be rendered on a display of the client device 130, to receive user input for a job definition for the job to be performed. The job definition can specify the work to be performed and the application (e.g., application 107,109,113) that should be used for the work. For example, the job definition may describe a job that pertains to a text messaging application, and the work to be performed may include sending a group text message to multiple recipient devices. The text message may include a photo or an image. In another example, the job definition may describe a job that pertains to a video chat application, and the work to be performed may include exchanging real-time audio/video communications between multiple user devices.

The job scheduler sub-system 147 can receive user input for the job definition and can create a job definition using the job description language of the cluster management system 140. Various traditional cluster management systems each have a respective job description language that allows users to define jobs and create job requests. Some of the conventional job description languages may be a proprietary job description language. When a job request is created, the job request can be submitted to a particular job scheduler (e.g., job scheduler sub-system 147) that supports the particular job description language. With traditional job scheduling systems, a job definition and a job request that are created using a particular job description language may not be supported by a job scheduler if that job scheduler cannot process that particular job description language. According to various implementations of the present disclosure, the job submission sub-system 143 can include a tagging module 145 for creating tags that describe handling expectation parameters for the particular job and/or feature parameters of the particular application (e.g., application 107,109,113) in a description language that is independent of the job description language that is used for a job definition. Unlike traditional quality of service (QoS) specifications that are in the proprietary language respective to the description language of the job definition, implementations of the present disclosure create QoS tags for jobs in a non-proprietary description language that can be interpreted and processed by a tag handler module 149 in a job scheduler sub-system 147. Implementations of the present disclosure include a job scheduler sub-system 147 that can process both the non-proprietary description language of QoS tags and a proprietary job description language that may be used to define a job and/or create a job request.

Unlike traditional QoS specifications that include quantitative and/or hard limits for computing resource quotas, the tagging module 145 can create tags that have a declarative format that includes concise, descriptive and/or qualitative language to indicate parameters of user expectations of how a job should be handled by the resource environment 150 and/or feature parameters of the application (e.g., application 107,109,113) used for the job. Examples of job handling expectation parameters can include, and are not limited to, latency for the job, dispatch for the job, execution time length for job, data accuracy for the job, and security for the job. Examples of feature parameters of an application (e.g., application 107,109,113) can include, and are not limited to, the media (e.g., audio, video, multi-media, text, image, etc.) associated with the application, the media definition (e.g., high definition, standard definition) associated with the application, time constraints (e.g., real-time) that may be associated with the application, and the platform (e.g., mobile platform, desktop platform, gaming platform) of the application. A tag can include description language for one or more job handling expectation parameters, one or more feature parameters of an application, or any combination of such parameters.

For example, for a job that pertains to a text messaging application, the work to be performed may include sending a group text message to multiple recipient devices, and the tags may be "short lived", "low latency" and "dispatch quickly" to respectively describe the expected latency for the job, expected execution time length for job, and the expected dispatch for the job. Another example of the tags for the job may be "short lived", "low latency", and "mobile platform" to describe the expected latency for the job, expected execution time length for job, and the platform type for the application to be used for the job.

To create the tags, the tagging module 145 can provide a GUI, which can be rendered on a display of the client device 130, that presents a set of pre-defined tags which a user at an entity (e.g., Enterprise-ABC) can select from. The set of pre-defined tags can be stored as tag option information 165 in a data store 160 that is coupled to the tagging module 145. The set of pre-defined tags can be configurable and/or user defined. The set of pre-defined tags can be user defined by one or more users at the resource environment, one or more users at one or more entities, or a combination of such users.

A data store 160 can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

A user (e.g., user at Enterprise-ABC) can select one or more tags, via the GUI, that are the most appropriate to the application that is to be used for the job. The tagging module 145 can receive the user selection of the one or more tags, create metadata for a job request and embed the one or more selected tags for the job in the metadata. The tagging module 145 and/or job submission sub-system 143 can add the metadata, which includes the tags for the job, to the job definition to create a job request for the job, and send the job request to the job scheduler sub-system 147.

The job scheduler sub-system 147 can include a tag handler module 149 for interpreting the one or more tags in a received job request and allocating resources in the resource environment 150 for the job request based on the tags. The job scheduler sub-system 147 can then schedule the job to be performed using the allocated resources. The job scheduler sub-system 147 can select resources that satisfy the requirements corresponding to the tags. For example, the job scheduler sub-system 147 can select resources for instantiating a particular VM 105A,105B, 105N or container 171A,171B,171N that satisfies the requirements corresponding to the tags for performing the requested job (e.g., sending a group text message to multiple recipient devices, exchanging real-time audio/video communications between multiple user devices, etc.).

The job scheduler sub-system 147 can use tag mapping information 163 that is stored in a data store 160 to translate the tags into resource requirements in a format that can be processed by the job scheduler sub-system 147. The resource requirements can include, and are not limited to, the type of resource (e.g., container, VM) to use for deploying an application (e.g., application 107,109,113), the amount of CPU, the amount of memory, etc. The tag mapping information 163 can be configurable and/or user defined. The tag mapping information 163 can be user defined by one or more users at the resource environment, one or more users at one or more entities, or a combination of such users.

For example, the tag mapping information 163 may map the tag of "low latency" to 10 CPUs. In another example, the tag mapping information 163 may map the tags "sensitive data" or "secure data" to a virtual machine, rather than to a container. In another example, the tag mapping information 163 may map the tag "dispatch quickly" to a container, rather than to a virtual machine.

The tag handler module 149 can provide a tag translation of the one or more tags into resource requirements to the job scheduler sub-system 147, and the job scheduler sub-system 147 can select resources that satisfy the resource requirements. The job scheduler sub-system 147 can allocate the selected resources to the job request and schedule the job to be performed by the allocated resources. The job scheduler sub-system 147 can schedule parallel jobs at the resource environment 150. The job scheduler sub-system 147 can allocate resources (e.g., processors, memory, containers, VMs, etc.) to a job on submission, if the resources are available. If the resources are not currently available, the job scheduler sub-system 147 can queue the job in a queue in the resource environment 150 and schedule the job to be started at a later time, for example, when the allocated resources become available.

The resource environment 150 can be a cloud computing environment that is provided by a cloud provider or a big data environment that is provided by a big data provider. For example, the resource environment 150 can include a cloud provider that provides resources using an Infrastructure-as-a-Service (IaaS) model.

In one implementation, the computing resources can be provided to entities on a subscription basis. For example, the resource environment 150 may be a cloud and one or more different entities may be subscribers to the resources of the cloud. A cloud computing environment can include a cloud, which can be a public cloud, a private cloud, or a hybrid cloud. A private cloud can include a private network. A public cloud can have an infrastructure that is made available to the general public or to a large industry group. A public cloud can be owned by an organization providing cloud services, also known as a cloud provider. A hybrid cloud can have an infrastructure that is a composition of two or more clouds (e.g., private, public) that remain unique entities, but are bound together by standardized or proprietary technology that enables data and application portability (e.g., load balancing between clouds).

In another implementation, the computing resources can be provided to entities without requiring a subscription. For example, the resource environment 150 may be a big data environment or a cloud that is owned and maintained by a single entity, Enterprise-ABC, and one or more different sub-entities (e.g., departments) of the same entity, Enterprise-ABC, may request resources of the big data environment.

"Big data" generally describes a collection of data sets that is significantly large and complex that it becomes difficult to process using conventional database management tools. A big data environment can include data sets stored on multiple data stores with data sizes beyond the ability of traditionally-used software tools to capture, curate, manage, and process the data within a tolerable elapsed time. For example, the data that is being managed in a big data environment can include multiple data sets, where a single data set may be a few dozen terabytes to many petabytes of data. Big data can be regarded as data that is high-volume, high-velocity, and/or high variety information assets that require forms of processing to enable enhanced decision making, insight discovery and process optimization. A big data environment can include one or more host machines for containers 171A,171B,171N.

The resource environment 150 can include multiple host machines 101,103 connected via one or more networks within the resource environment 150. An individual host machine 101,103 can host one or more containers (e.g., containers 171A,171B,171N) or one or more virtual machines (e.g., VM 105A,105B,105N) for deploying applications (e.g., applications 107,109,113). For brevity and simplicity, one host machine 101 hosting three virtual machines 105,A,105B,105N, and another host machine 103 hosting three containers 171A,171B,171N are used as examples in architecture 100. In one implementation, the resource environment 150 is a cloud having host machines that host virtual machines and/or containers. In one implementation, the resource environment 150 is a big data environment having host machines that host containers and/or virtual machines. The one or more networks may be public networks, private networks, or a combination thereof. The individual host machines 101,103 can be a server computer system, a desktop computer or any other computing device.

Figure 2:
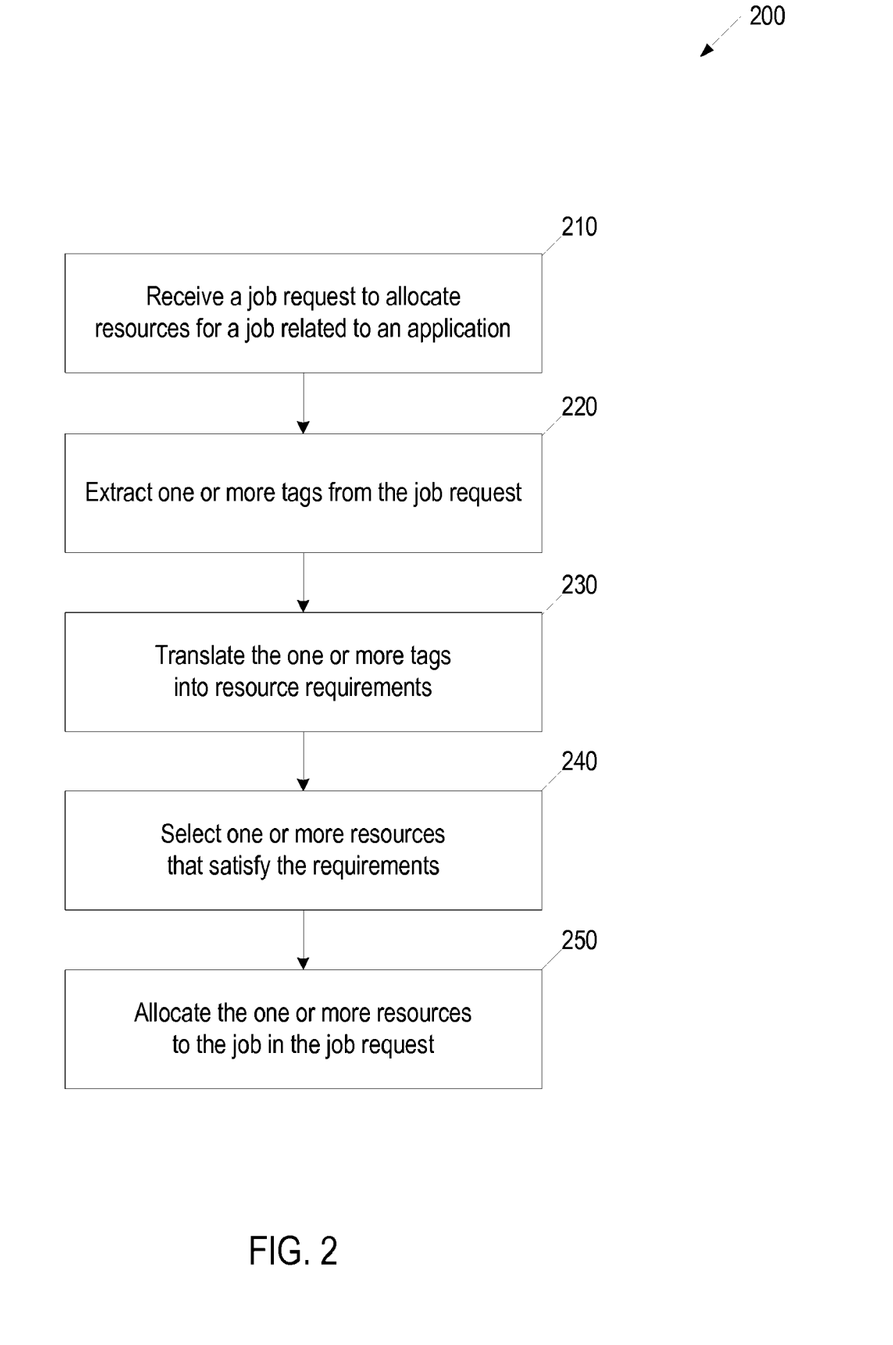
FIG. 2 is a flow diagram for a method for using quality of service tags to allocate resources to a job, in accordance with one or more implementations of the present disclosure.

FIG. 2 is a flow diagram for a method 200 for using quality of service tags to allocate resources to a job, in accordance with one or more implementations of the present disclosure. Method 200 can be performed by processing logic that can comprise hardware (e.g., circuitry, dedicated logic, programmable logic, microcode, etc.), software (e.g., instructions run on a processing device), or a combination thereof. In one implementation, method 200 is performed by a tag handler module (e.g., tag handler module 149 of FIG. 1) executed by a processing device in a computing machine. At least a portion of method 200 may be performed by a job scheduler sub-system (e.g., job scheduler sub-system 147 in FIG. 1). At least a portion of method 200 can be performed automatically by the computing machine without user interaction.

At block 210, the processing device receives a job request to allocate resources in a resource environment (e.g., resource environment 150 in FIG. 1) for a job that is specified by the job request. The job can be related to a particular application. The job request can be received from a job submission sub-system (e.g., job submission sub-system 143 in FIG. 1). In one implementation, the job submission sub-system is a sub-system that can requests jobs for container-based applications. In another implementation, the job submission sub-system is a sub-system that can requests jobs for applications in a virtual machine model. In another implementation, the job submission sub-system is a sub-system that can requests jobs for container-based applications and/or virtual machine based applications.

At block 220, the processing device extracts one or more tags from the job request. The tags can describe feature parameters of the application and/or requester expectations of how the resource environment should handle the job. Examples of feature parameters of an application (e.g., application 107,109,113) can include, and are not limited to, the media (e.g., audio, video, multi-media, text, image, etc.) associated with the application, the media definition (e.g., high definition, standard definition) associated with the application, time constraints (e.g., real-time) that may be associated with the application, and the platform (e.g., mobile platform, desktop platform, gaming platform) of the application. Examples of job handling expectation parameters can include, and are not limited to, latency for the job, dispatch for the job, execution time length for job, data accuracy for the job, and security for the job.

Figure 3:
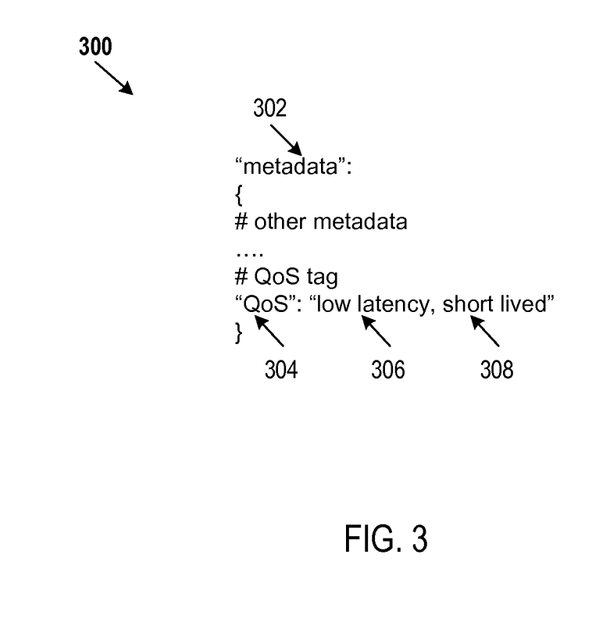
FIG. 3 is an example of metadata that includes one or more examples of QoS (Quality of Service) tags and example indicators, in accordance with one or more implementations of the present disclosure.

The job request can include metadata that embeds one or more tags. The processing device can search the metadata for the tags. The tags can include strings, characters, etc. In one implementation, the processing device searches for a metadata indicator and/or a QoS indicator, as specified in configuration data in a data store, in the job request. FIG. 3 is an example of metadata 300 that includes one or more examples of QoS tags and example indicators, in accordance with one or more implementations of the present disclosure. Metadata 300 includes a metadata indicator 302, a QoS indicator 304, tag 306 and tag 308. The configuration data may specify the processing device to search for at least a portion of the string "metadata" and/or a portions of the string "QoS" and/or one or more delimiters (e.g., colons, quotes) to locate the one or more tags (e.g., tags 306,308) for the job request. A metadata indicator 302, a QoS indicator 304, and the one or more tags 306,308 can include characters, delimiters, etc. The configuration data can be configurable and/or user defined.

At block 230, the processing device translates the tags into resource requirements. The processing device can access mapping information in a data store that maps tags to resource requirements, and can use the mapping information to translate the tags into one or more resource requirements. At block 240, the processing device selects one or more resources that satisfy the resource requirements, and allocates the one or more resources in the resource environment to the job that is requested in the job request based on the mapping of the tags at block 250. The machine nodes (e.g., host machines) in the resource environment can have different attributes. For example, the processing device may receive a job request, locate the metadata and/or tags in the job request, translate the tags to the type (e.g., virtual machine, container) of resource to instantiate and CPU and/or memory requirements, and load the image (e.g., container image, VM image) for the job. For example, the containers and VMs can be executed by host machines that have different processing powers. For example, the tags may be "low latency" and "short lived" and the processing device may locate a host machine that is able to quickly load a container image, and thus incur low startup time, and more computing resources, and thus, reduce run time.

In one implementation, the processing device can create one or more groups and/or sub-groups of job requests based on the tags in the job requests, and allocate one or more resources to a group or sub-group of jobs. The job requests that are in a particular group or sub-group are a sub-set of job requests from job requests that are stored in a data store (e.g., data store 160 in FIG. 1), and have at least one matching tag. For example, the processing device can assign job requests that contain the tag "short lived" to a group, and may assign a sub-set of the job requests in the "short lived" group that have the tag "low latency" to a sub-group. The processing device can allocate one or more of the same resources in the resource environment to a particular group or sub-group of job requests.

Figure 4:
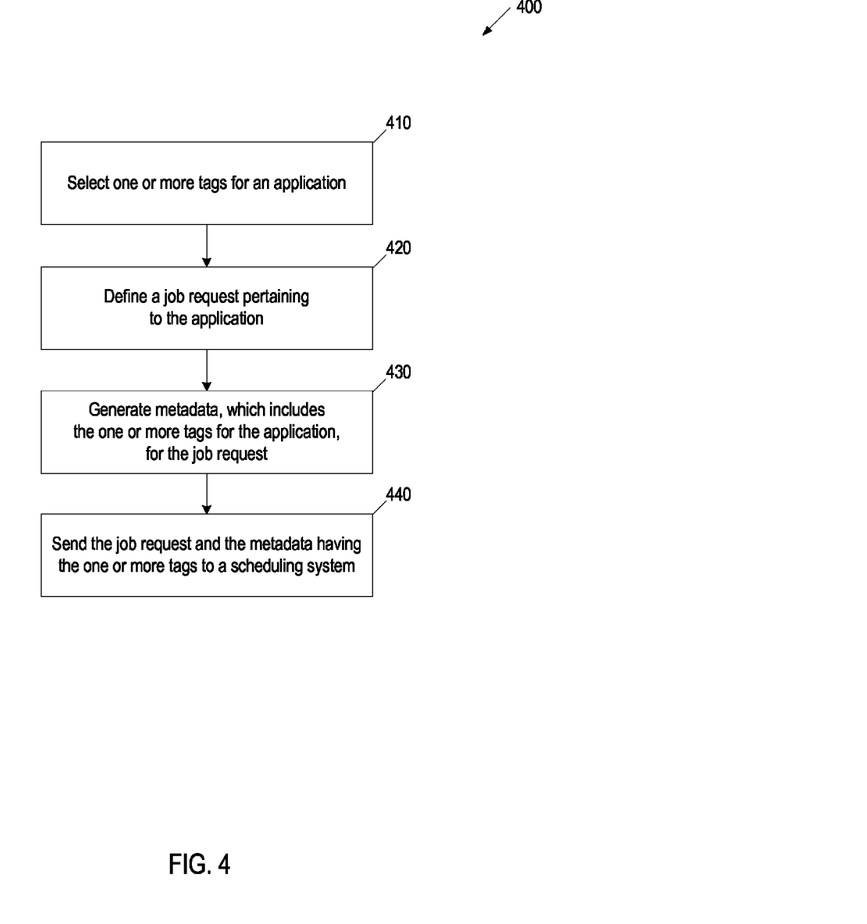
FIG. 4 is a flow diagram for a method for tagging a job request with quality of service descriptors for the job, in accordance with one or more implementations of the present disclosure.

FIG. 4 is a flow diagram for a method 400 for tagging a job request with quality of service descriptors for the job, in accordance with one or more implementations of the present disclosure. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a tagging module (e.g., tagging module 145 of FIG. 1) executed by a processing device in a computing machine. At least a portion of method 400 may be performed by a job submission sub-system (e.g., job submission sub-system 143 in FIG. 1). At least a portion of method 400 can be performed automatically by the computing machine without user interaction.

At block 410, the processing device selects one or more tags for an application. The processing device can receive user input, via a graphical user interface (GUI), of the selection of the one or tags for the application. The one or more tags describe handling parameters of the job and/or features of the application. In one implementation, the GUI presents a set of tags, which are defined and provided by an owner or system administrator of a resource environment, from which a user can select the one or more tags for the application. At block 420, the processing device defines a job request pertaining to the application. The processing device can receive user input via the GUI for defining the job request. The one or more tags can be in a description language that is different from a description language specifying the job in the job request. At block 430, the processing device generates metadata, which includes the one or more tags for the application, for the job request, and sends the job request and the metadata having the one or more tags to a scheduling system at block 440. In one implementation, the metadata is in the description language that is different from the description language specifying the job in the job request, and the one or more tags are in the same description language as the metadata. In another implementation, the metadata is in a description language that is the same as the description language specifying the job in the job request, and the one or more tags are in a different description language than the metadata and the job definition.

Figure 5:
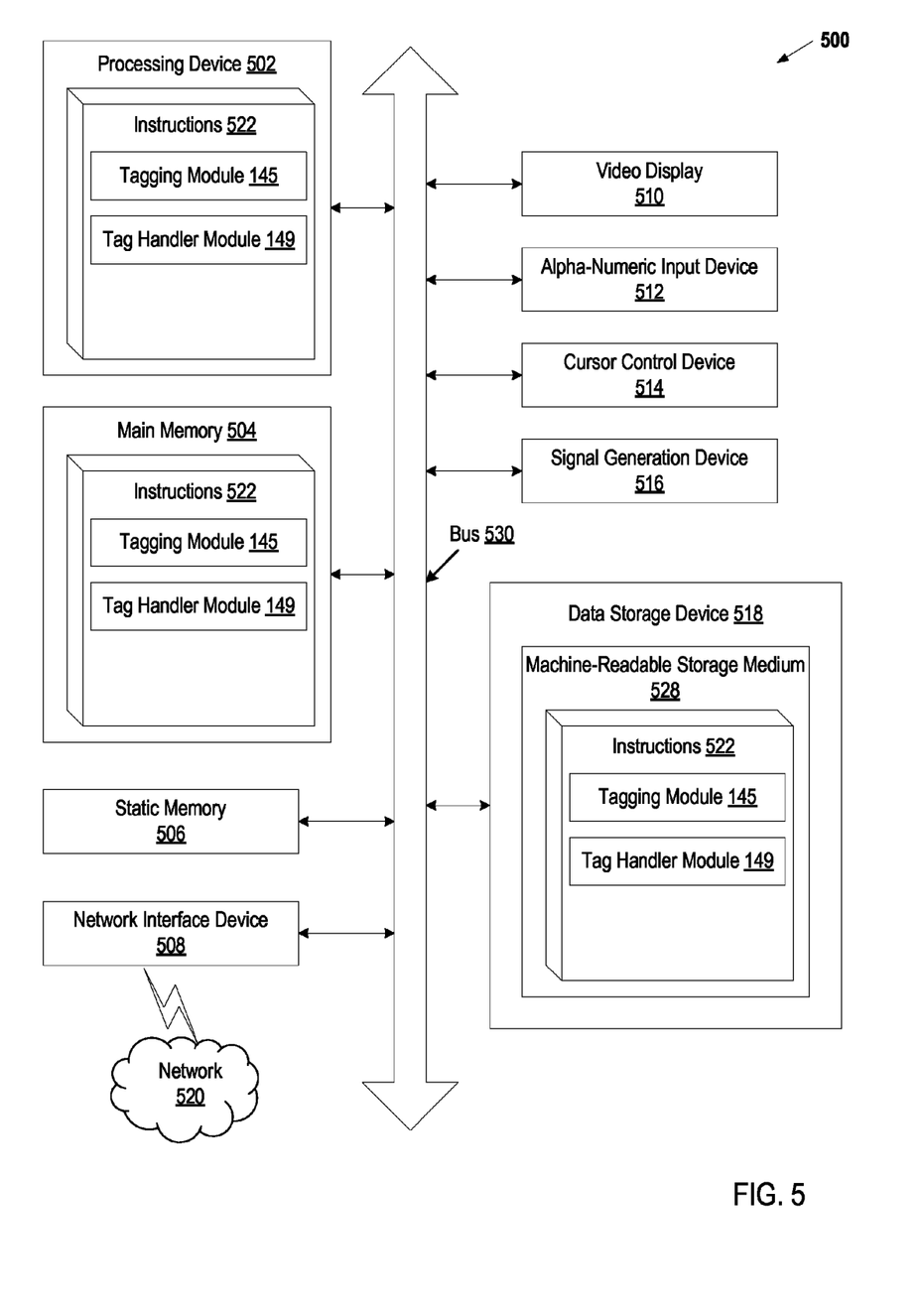
FIG. 5 is a block diagram of an example computer system that may perform one or more of the operations described herein.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 804 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data store device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT), an alphanumeric input device 512 (e.g., a keyboard), a cursor control device 514 (e.g., a mouse), and a signal generation device 516 (e.g., speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 804 and the processing device 502 also constituting machine-readable storage media.

In one implementation, the instructions 522 include instructions for a tagging module (e.g., tagging module 145 of FIG. 1), and/or a software library containing methods that call the tagging module. In one implementation, the instructions 522 include instructions for a tag handler module (e.g., tag handler module 149 of FIG. 1), and/or a software library containing methods that call the tag handler module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "extracting" or "allocating" or "determining" or "accessing" or "translating" or "creating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving, by a processing device, a job request to allocate one or more resources in a resource environment to a job, the job being related to an application, the job request specifying the job using a first description language;
extracting one or more tags from the job request, the one or more tags describing at least one of a handling parameter of the job or a feature of the application, wherein the one or more tags are in a second description language different from the first description language, wherein the second description language is in a declarative tag format with language that describes the at least one of the handling parameter or the feature of the application without quantifying a specific quantity of resources to be used in the resource environment;
translating the one or more tags into a resource requirement in a second format that can be processed by a job scheduler executing by the processing device, wherein the translating comprises using mapping information that maps the one or more tags into the resource requirement that can be processed by the job scheduler; and
allocating, by the job scheduler, one or more resources in the resource environment to the job in view of the resource requirement, wherein allocating one or more resources in the resource environment to the job in view of the one or more tags comprises:
determining whether one or more tags indicate data for the job is secure data;
instantiating a container for the job if one or more tags indicate that the data for the job is not secure data; and
instantiating a virtual machine for the job if one or more tags indicate that the data for the job is secure data.

2. The method of claim 1, wherein the one or more tags are received from a job submission system that requests jobs for container-based applications.

3. The method of claim 1, wherein the one or more tags are embedded in metadata of the job request, the metadata being in the second description language different from the first description language.

4. The method of claim 1, wherein the one or more tags in the job request are selected from a set of tags defined by a system administrator of the resource environment.

5. The method of claim 1, further comprising:
creating a group of job requests, where the job requests in the group are a sub-set of job requests from a plurality of job requests having at least one matching tag; and
allocating one or more same resources in the resource environment to the group of job requests.

6. A non-transitory computer-readable storage medium including instructions that, when executed by a processing device, cause the processing device to:
receive, by a processing device, a job request to allocate one or more resources in a resource environment to a job, the job being related to an application, the job request specifying the job using a first description language;
extract one or more tags from the job request, the one or more tags describing at least one of a handling parameter of the job or a feature of the application, wherein the one or more tags are in a declarative tag format with language that describes the at least one of the handling parameter or the feature of the application without quantifying a specific quantity of resources to be used in the resource environment, wherein the one or more tags do not specify a resource type of a container or a virtual machine to be used for the job request;
determine whether to instantiate a container or a virtual machine for the job in view of the one or more tags in the declarative format; and
allocate one or more resources in the resource environment to instantiate the container or the virtual machine for deploying the application for the job, wherein, to determine whether to instantiate a container or a virtual machine for the job, the processing device is to:
determine whether one or more tags indicate data for the job is secure data;
instantiate the container for the job if the one or more tags indicate that the data for the job is not secure data; and instantiate the virtual machine for the job if the one or more tags indicate that the data for the job is secure data.

7. The non-transitory computer-readable storage medium of claim 6, wherein the processing device is further to:
access mapping information that maps the one or more tags to a plurality of resource requirements; and
translate the one or more tags into the plurality of resource requirements via the mapping information.

8. The non-transitory computer-readable storage medium of claim 6, wherein the one or more tags are embedded in metadata of the job request, the metadata being in a second description language different from the first description language.

9. The non-transitory computer-readable storage medium of claim 6, wherein the one or more tags in the job request are selected from a set of tags defined by a system administrator of the resource environment.

10. The non-transitory computer-readable storage medium of claim 6, wherein the processing device is further to:
create a group of job requests, where the job requests in the group are a sub-set of job requests from a plurality of job requests having at least one matching tag; and
allocate one or more same resources in the resource environment to the group of job requests.

11. A system comprising:
a memory; and
a processing device operatively coupled to the memory, to:
receive a job request to allocate one or more resources in a resource environment to a job, the job being related to an application, the job request specifying the job using a first description language;
extract one or more tags from the job request, the one or more tags at least one of a handling parameter of the job or a feature of the application, wherein the one or more tags are in a declarative tag format with information to describe the at least one of the handling parameter or the feature of the application without specifying a specific quantity of resources to be used in the resource environment;
translate the one or more tags into a resource requirement in a second format that can be processed by a job scheduler executing by the processing device, wherein, to translate the processing device is to use mapping information that maps the one or more tags into the resource requirement that can be processed by the job scheduler; and
allocate, by the job scheduler, one or more resources in the resource environment to the job in view of the resource requirement, wherein, to allocate one or more resources in the resource environment to the job in view of the one or more tags, the processing device is to:
determine whether one or more tags indicate data for the job is secure data;
instantiate a container for the job if one or more tags indicate that the data for the job is not secure data; and
instantiate a virtual machine for the job if one or more tags indicate that the data for the job is secure data.

12. The system of claim 11, wherein the one or more tags are received from a job submission system that requests jobs for container-based applications.

13. The system of claim 11, wherein the one or more tags are embedded in metadata of the job request, the metadata being in a second description language different from the first description language.

14. The system of claim 11, wherein the one or more tags in the job request are selected from a set of tags defined by a system administrator of the resource environment.

15. The system of claim 11, wherein the processing device is further to:
create a group of job requests, where the job requests in the group are a sub-set of job requests from a plurality of job requests having at least one matching tag; and
allocate one or more same resources in the resource environment to the group of job requests.

* * * * *